United States Patent
Morris et al.

(10) Patent No.: US 9,438,960 B2
(45) Date of Patent: *Sep. 6, 2016

(54) SYSTEM AND METHOD FOR INTERACTING WITH SOCIAL NETWORKING IN AN INTERNET PROTOCOL TELEVISION SYSTEM

(71) Applicant: AT&T Intellectual Property I, LP, Atlanta, GA (US)

(72) Inventors: Nadia Morris, Decatur, GA (US); N. Peter Hill, Atlanta, GA (US); Troy C. Meuninck, Newman, GA (US); Virginia S. Ng, Lawrenceville, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 436 days.

This patent is subject to a terminal disclaimer.

(21) Appl. No.: 14/037,917

(22) Filed: Sep. 26, 2013

(65) Prior Publication Data

US 2014/0033251 A1 Jan. 30, 2014

Related U.S. Application Data

(63) Continuation of application No. 12/612,450, filed on Nov. 4, 2009, now Pat. No. 8,566,876.

(51) Int. Cl.
*G06F 3/00* (2006.01)
*G06F 13/00* (2006.01)
*H04N 5/445* (2011.01)
(Continued)

(52) U.S. Cl.
CPC ...... *H04N 21/4788* (2013.01); *H04N 7/17318* (2013.01); *H04N 21/252* (2013.01); *H04N 21/25875* (2013.01); *H04N 21/4661* (2013.01); *H04N 21/4668* (2013.01);
(Continued)

(58) Field of Classification Search
CPC ............... H04N 21/4532; H04N 5/44543; H04N 21/44222; H04N 7/163; H04N 21/482
USPC ......... 725/40–53, 59–61, 109; 715/733–736, 715/738–739; 705/319; 709/204–205
See application file for complete search history.

(56) References Cited

U.S. PATENT DOCUMENTS

2006/0271953 A1 11/2006 Jacoby
2007/0130580 A1 6/2007 Covell
(Continued)

FOREIGN PATENT DOCUMENTS

WO 2009082784 7/2009

OTHER PUBLICATIONS

Graffi, "A Distributed Platform for Multimedia Communities", 10th IEEE International Symposium on Multimedia, Nov. 2008; pp. 208-213.
(Continued)

*Primary Examiner* — Jason Salce
(74) *Attorney, Agent, or Firm* — Guntin & Gust, PLC; Ralph Trementozzi

(57) ABSTRACT

In an Internet protocol television network, a set-top box includes a social network interface module and a remote control interface module. The social network interface module receives a first selection of a content item from the remote control interface module, and receives a second selection of a comment from the remote control interface module. The social network interface module also posts the second selection on a social network system.

20 Claims, 5 Drawing Sheets

(51) Int. Cl.
| | |
|---|---|
| H04N 21/4788 | (2011.01) |
| H04N 7/173 | (2011.01) |
| H04N 21/25 | (2011.01) |
| H04N 21/258 | (2011.01) |
| H04N 21/466 | (2011.01) |
| H04N 21/472 | (2011.01) |
| H04N 21/475 | (2011.01) |
| H04N 21/4782 | (2011.01) |
| H04N 21/61 | (2011.01) |

(52) U.S. Cl.
CPC ..... *H04N 21/4756* (2013.01); *H04N 21/4782* (2013.01); *H04N 21/47202* (2013.01); *H04N 21/6175* (2013.01)

(56) References Cited

U.S. PATENT DOCUMENTS

| | | |
|---|---|---|
| 2007/0169165 A1 | 7/2007 | Crull |
| 2008/0072247 A1 | 3/2008 | Barnard |
| 2008/0134052 A1 | 6/2008 | Davis et al. |
| 2008/0163312 A1 | 7/2008 | Faust |
| 2008/0178230 A1 | 7/2008 | Eyal |
| 2008/0178234 A1 | 7/2008 | Eyal |
| 2008/0244413 A1 | 10/2008 | Sampson |
| 2008/0244681 A1 | 10/2008 | Gossweiler |
| 2009/0100469 A1 | 4/2009 | Conradt |
| 2009/0217335 A1 | 8/2009 | Wong et al. |
| 2009/0265737 A1 | 10/2009 | Issa |
| 2009/0293079 A1 | 11/2009 | McKee |
| 2009/0300680 A1 | 12/2009 | Cook |
| 2009/0328102 A1 | 12/2009 | Morris |
| 2010/0058417 A1 | 3/2010 | Rondeau |
| 2010/0169918 A1 | 7/2010 | Biesemeyer |
| 2010/0242074 A1 | 9/2010 | Rouse |
| 2010/0269144 A1 | 10/2010 | Forsman |
| 2010/0319034 A1 | 12/2010 | Mountain |
| 2011/0078724 A1 | 3/2011 | Mehta et al. |

OTHER PUBLICATIONS

Ko, "A Community Recommendation Method Based on Social Networks for Web 2.0-Based IPTV", Department of Computer Science, Korea Advance Institute of Science and Technology; IEEE 2009; 6-page document.

Montpetit, M et al., "The future of IPTV: Adding Social Networking and Mobility", CAD Systems in Microelectronics, 10th International Conference—The Experience of Designing and Application of, IEEE, Piscataway, NJ, USA, Jun. 2009, 405-409.

Patent Cooperation Treaty, "International Search Report and Written Opinion of the International Searching Authority", ISAIEP, by Officer Emanuela Marra, in PCT Application No. PCT/US201 01054863 document of 11 pages, dated Mar. 9, 2011.

SYSTEM AND METHOD FOR INTERACTING WITH SOCIAL NETWORKING IN AN INTERNET PROTOCOL TELEVISION SYSTEM

CROSS-REFERENCE TO RELATED APPLICATIONS

This application is a continuation of U.S. patent application Ser. No. 12/612,450 filed Nov. 4, 2009, which is incorporated herein by reference in its entirety.

FIELD OF THE DISCLOSURE

The present disclosure generally relates to an Internet protocol television system, and more particularly relates to Internet content on an Internet protocol television system.

BACKGROUND OF THE DISCLOSURE

An Internet protocol television (IPTV) service provider can transmit an IPTV signal to a user of the IPTV system via a central office, a serving area interface, and a residential gateway. The IPTV service provider can offer the user a variety of different content and services. For example, the IPTV service provider can supply users with real-time television programs that are typically available for the users to watch only at a specific date and time. The IPTV service providers can also offer the users on-demand movies that are available for an extended amount of time and that are provided to the users upon request of the on-demand movie. The user can also record audio or video content for storage in a digital format on the user's set-top box or on a data server on the IPTV system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed systems, methods or computer-readable media. Moreover, some statements may apply to some inventive features but not to others.

Figure 1:
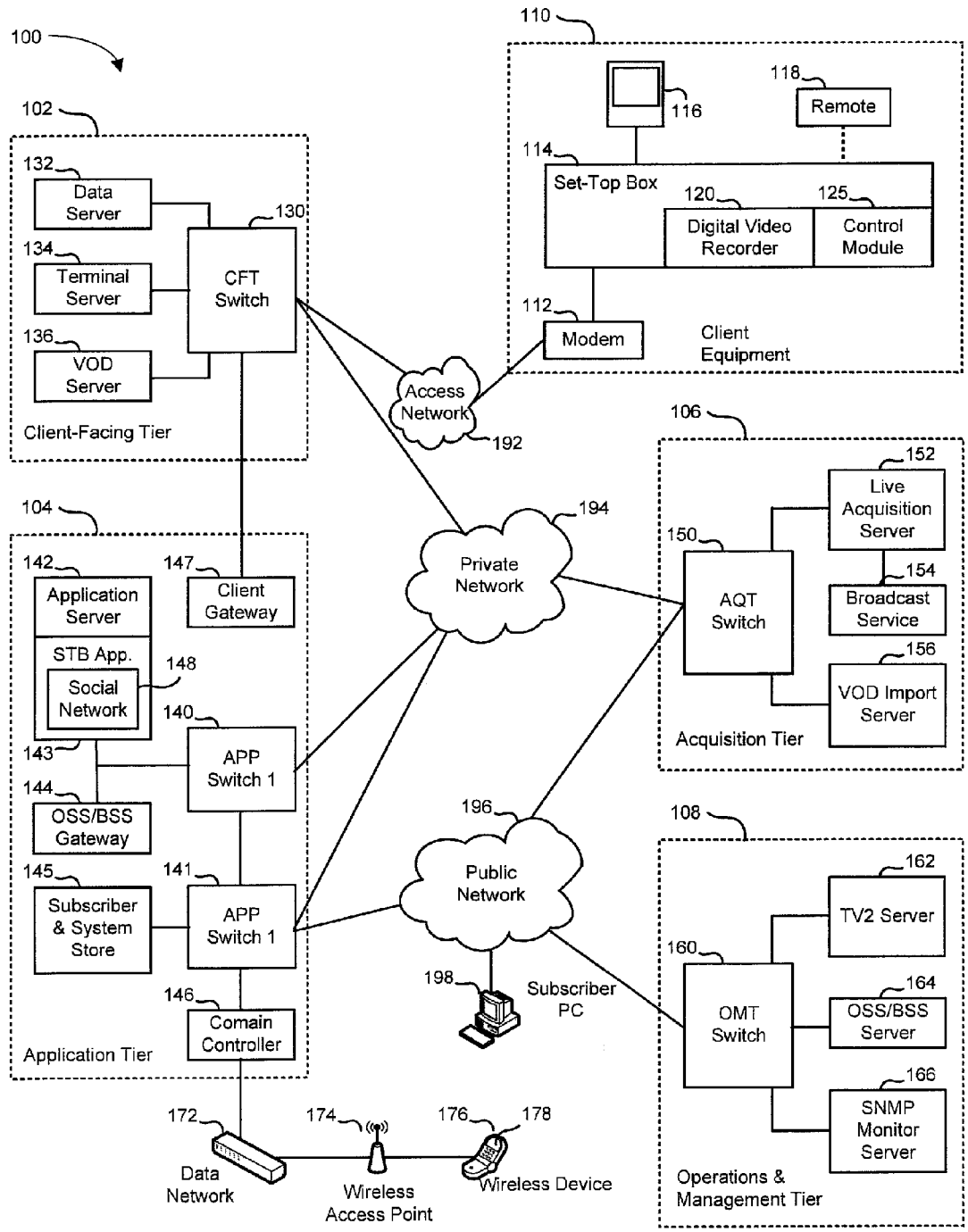
FIG. 1 is a block diagram illustrating an embodiment of an IPTV network.

FIG. 1 shows an embodiment of an IPTV system 100 including a client facing (CF) tier 102, an application tier 104, an acquisition tier 106, an operations and management (OM) tier 108, and one or more sets of client equipment 110. Client equipment 110 is typically located at the home or business premises of a subscriber to the IPTV system 100. IPTV system 100 includes an access network 192, a private network 194, and a public network 196. Each tier 102, 104, 106, and 108 is coupled to one or more of access network 192, private network 194, and public network 196. In an embodiment, CF tier 102 is coupled to access network 192 and to private network 194, application tier 104 is coupled to private network 194 and to public network 196, acquisition tier 106 is coupled to private network 194 and to public network 196, and OM tier 108 is coupled to public network 196. Client equipment 110 is coupled to access network 192.

Networks 192, 194 and 196 communicate information between tiers 102, 104, 106, and 108, and client equipment 110. Access network 192 communicates information between CF tier 102 and client equipment 110. Private network 194 communicates information between CF tier 102 and application tier 104, between application tier 104 and acquisition tier 106, and between acquisition tier 106 and CF tier 102. Public network 196 communicates information between application tier 104 and acquisition tier 106, between acquisition tier 106 and OM tier 108, and between OM tier 108 and application tier 104. Information is also communicated directly between CF tier 102 and application tier 104, as described below. The information communicated between tiers 102, 104, 106, and 108, and client equipment 110 includes encoded television programs, audio files, data files, commands, procedures, other information, or any combination thereof.

CF tier 102 communicates with multiple sets of client equipment 110 over a wide geographic area, such as a regional area, a metropolitan area, a viewing area, or any other suitable geographic area that is supported by access network 192. Client equipment 110 includes a modem 112, a set-top box 114, a display device 116, and a remote control 118. The set-top box 114 includes a digital video recorder (DVR) 120 and a control module 125. Modem 112 is coupled to access network 192, and translates information from a form suitable for transmission over access network 192 to a form suitable for use by set-top box 114, and vice versa. In a non-limiting example, modem 112 is coupled to access network 192 via fiber-optic cables, a digital subscriber line (DSL), another network fabric, or any combination thereof.

The information that CF tier 102 communicates to modem 112 is sent to set-top box 114, which processes the information into a form suitable for display by display device 116 or for recording by DVR 120. Set-top box 114 receives digitally encoded content from CF tier 102 for display on display device 116, or for recording by DVR 120. Set-top box 114 can also receive data from CF tier 102, and render or display the data on display device 116. Further, set-top box 114 can send data to CF tier 102. Such data can include service requests, or commands from the subscriber, received by set-top box 112 via remote control 118. For example, control module 125 can include a remote control interface module (not illustrated) for receiving inputs to set-top box 112 from remote control 118. In this way, the subscriber can request services or information or respond to a request for information from IPTV system 100. Control module 125 includes instructions that are executable by set-top box 114 to control the data flow between the subscriber and IPTV system 100. Control module 125 can include an IPTV software platform such as Microsoft™ TV IPTV Edition.

Control module 125 can facilitate data communication between set-top box 114 and IPTV system 100. For example, control module 125 can include a procedure whereby set-top box 114 receives a request to record content on DVR 120, or sends a status to IPTV system 100 that the content has been recorded. Likewise, control module 125 can include a procedure whereby the subscriber can interact with IPTV system 100 to receive and execute a viewing preference that the subscriber has created in IPTV system 100. Such preferences can be created via remote control 118, or through a subscriber account that is accessible through public network 196, such as through a subscriber's personal computer 198. A non-limiting example of remote control 118 includes a hand-held controller device, a game controller device, a keyboard/mouse device, another control device, or any combination thereof.

CF tier 102 includes a client-facing tier (CFT) switch 130, a data server 132, a terminal server 134, and a video-on-demand (VOD) server 136. CFT switch 130 manages communication with client equipment 110 through access network 192 and with application tier 104 and acquisition tier 106 through private network 194. CFT switch 130 is coupled to data server 132 that stores data transmitted in response to subscriber requests. CFT switch 130 is also coupled to terminal server 134 that provides terminal devices, such as a game application server, or other devices with a common connection point to private network 194. CFT switch 130 is also coupled to VOD server 136.

Application tier 104 includes application tier (APP) switches 140 and 141, an application server 142, an operation systems and support/billing systems and support (OSS/BSS) server 144, a subscriber and system store 145, a domain controller 146, and a client gateway 147. APP switches 140 and 141 manage communication with CF tier 102 and acquisition tier 106 through private network 194. APP switch 141 also manages communication with acquisition tier 106 and OM tier 108 through public network 196. APP switch 140 is coupled to APP switch 141. APP switch 140 is also coupled to application server 142 and to OSS/BSS gateway 144. Application server 142 provides applications to set-top box 114 through a set-top box application 143, so that set-top box 114 can provide functions such as recording and displaying content, messaging, and processing of IPTV data and VOD material. OSS/BSS gateway 144 includes operation systems and support (OSS) data, and billing systems and support (BSS) data.

APP switch 141 is coupled to domain controller 146 and to subscriber and system store 145. Domain controller 146 provides web access, for example, to subscribers via public network 196. Subscriber and system store 145 includes account information that is associated with subscribers who access IPTV system 100 via private network 194 or public network 196. Application tier 104 also communicates data directly to CF tier 102 through client gateway 147. In this embodiment, client gateway 147 is coupled directly to CFT switch 130.

Client gateway 147 provides subscriber access to private network 194 and tiers coupled thereto. In particular, set-top box 114 accesses IPTV system 100 via access network 192 using information received from client gateway 147. Access network 192 provides security for private network 194. Client equipment 110 accesses client gateway 147 via access network 192, and client gateway 147 allows client equipment 110 to access private network 194 once client equipment 110 is authenticated or verified. Similarly, client gateway 147 prevents unauthorized client equipment (not illustrated), such as hacker computers or stolen set-top box devices, from accessing private network 194 by denying access to these devices beyond access network 192.

For example, when set-top box device 114 accesses IPTV system 100 via access network 192, client gateway 147 verifies subscriber information by communicating with subscriber and system store 145 via private network 194, APP switch 140, and APP switch 141. Further, client gateway 147 verifies billing information and status by communicating with OSS/BSS gateway 144 via private network 194 and APP switch 140. OSS/BSS gateway 144 transmits a query across APP switch 140, to APP switch 141, and APP switch 141 communicates the query across public network 196 to an OSS/BSS server 164 (described below). After the client gateway 147 confirms subscriber and/or billing information, client gateway 147 allows set-top box device 114 access to IPTV system 100 content and VOD server 136 content. If client gateway 147 cannot verify subscriber information for set-top box 114, such as when set-top box 114 is connected to a different twisted pair, or when set-top box 114 is stolen, client gateway 147 denies transmissions to and from set-top box device 114 beyond access network 192.

Domain controller 146 communicates with public network 196 via APP switch 141. Domain controller 146 includes a web portal that allows a subscriber to access IPTV system 100 using a personal computer 198. Domain controller 146 also communicates with a data network 172 that is connected to a wireless access point 174. Wireless access point 174 communicates with a subscriber's wireless device 176 to provide wireless access to IPTV system 100. A non-limiting example of a wireless device 176 includes a cellular telephone, a personal digital assistant, a mobile e-mail device, a portable digital video device, another wireless device, or any combination thereof. Wireless device 176 includes a display device 178 for displaying information from IPTV system 100. Display device 178 includes a text display, a picture display, a video display or any combination thereof.

Acquisition tier 106 includes an acquisition tier (AQT) switch 150, a live acquisition server 152, a broadcast service 154, and a video-on-demand importer server 156. AQT switch 150 manages communication with CF tier 104 and application tier 104 through private network 194, and with application tier 104 and OM tier 108 through public network 196. AQT switch 150 is coupled to live acquisition server 152, and video-on-demand importer server 156. Live acquisition server 152 acquires television content from broadcast service 154. Live acquisition server 152 sends the television content to AQT switch 150 for transmission to CF tier 102 via private network 194. The television content is further encoded at data server 132, and sent to client equipment 110 via access network 192. Set-top box 114 receives the television content from modem 112, decodes the television content, and transmits the information to display device 116 according to commands from remote control device 120.

Additionally, VOD importer server 156 receives content from one or more video-on-demand sources that are outside IPTV system 100, such as movie studios and programmers of non-live content. VOD importer server 156 transmits the video-on-demand content to AQT switch 150, and AQT switch 150 communicates the material to CFT switch 130 via private network 194. The video-on-demand content is stored on VOD server 136. When a subscriber issues a request for VOD content to set-top box 114 through remote control 118, the request is transmitted over access network 192 to VOD server 136 via CFT switch 130. Upon receiving such a request, VOD server 136 retrieves the requested VOD content and transmits the content to set-top box or 114 across access network 192 via CFT switch 130.

OM tier 108 includes an OM tier (OMT) switch 160, a TV2 server 162, the OSS/BSS server 164, and a simple network management protocol (SNMP) monitor server 166. OMT switch 160 manages the communication between OM tier 108 and public network 196. OMT switch 160 is coupled to TV2 server 162, OSS/BSS server 164, and SNMP monitor server 166 that monitors network devices. TV2 server 162 receives television content from live acquisition server 152, or video-on-demand content from VOD importer server 156 through public network 196. The television and video-on-demand content is sent by TV2 server 162 to OMT switch 160 and forwarded to a subscriber of IPTV system 100 who accesses public network 196 through personal computer 198.

Set-top box application 143 includes a social network interface module 148. Social network interface module 148 provides a personalized interface to social network services for subscribers to IPTV system 100. When a subscriber wishes to interact over IPTV system 100 with social network services, the subscriber interacts with social network interface module 148, for example by tuning set-top box 114 to a social network channel. The subscriber is presented with menu selections to enroll with social network services, or to interact with social network services with which the subscriber is enrolled. The subscriber can also post content on the social network services, and retrieve posted content from social network services. In the illustrated embodiment, social network interface module 148 resides in the application tier 104 on the application server 142. In another embodiment (not illustrated), set-top box 114 includes a social network interface module similar to social network interface module 148 to provide the described functionality of social network interface module 148. Social network services include publicly available social network sites on the Internet, such as Facebook, Twitter, or other Internet social network sites, social network sites provided by the operator of IPTV system 100 or other proprietary social network services, or a combination thereof.

FIGS. 2-5 illustrate screens depicted on display device 116 generated by an embodiment of social network interface module 148. In each case, content information can be sent by application server 142 to CF tier 102, where data server 132 can format the information into a form suitable for transmission to set-top box 114 for display on display device 116. In the alternative, application server 142 can format the information in a form suitable for transmission to set-top box 114, and send the information to CFT switch 130 to be forwarded to the set-top box. The subscriber can interact via remote control 118 with set-top box 114 to provide information back to application server 142, and thus perform the actions described below. In each case, the elements depicted on the screens are illustrative of features of social network interface module 148, and are not meant to limit the content that may be displayed on display device 116. For example, the information contained in the screens may be shown alone, or in combination with other information such as advertisements, other news or weather information, a picture-in-picture display, other content, or a combination thereof. Each of the screens depicted in FIGS. 2-5 can be accessed through one or more screens (not illustrated), which direct the subscriber to the appropriate screens that enable the subscriber to perform the described functionality.

Figure 2:
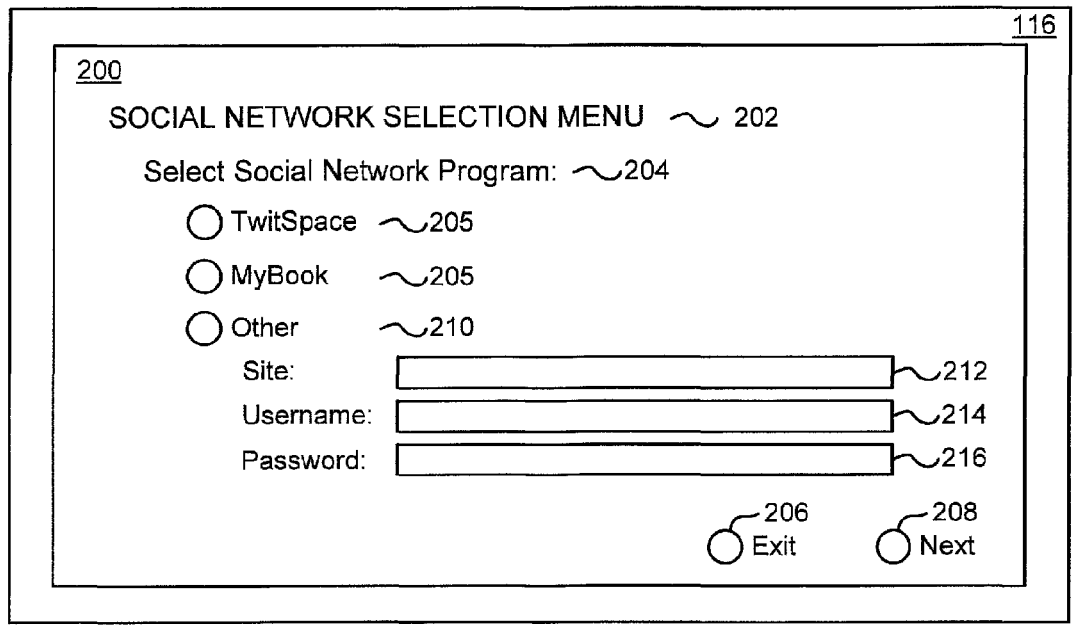
FIGS. 2-5 illustrate screens depicted on a display device in the IPTV network of FIG. 1, according to an embodiment of the present disclosure.

FIG. 2 illustrates an embodiment of a social network selection screen 200 depicted on display device 116. Social network selection screen 200 includes a welcome banner 202, a social network selection banner 204, one or more pre-determined social network selections 205, an exit selection 206, a next selection 208, and a new social network selection 210. New social network selection 210 includes a social network site entry box 212, a username entry box 214, and a password entry box 216. Welcome banner 202 identifies the current screen as the screen with which the subscriber interacts to select social network services. Social network selection banner 204 prompts the subscriber to select from the list of social network selections 205 and 210. Exit selection 206 permits the subscriber to end the interaction with social network interface module 148. In the embodiment where interaction with social network interface module 148 is initiated by selecting a social network channel on set-top box 114, exit selection 206 is optional, and the functionality of exit selection 206 can be performed by changing channels on set-top box 114. Next selection 208 permits the subscriber to continue the interaction with social network interface module 148 through the following screens, as described below.

In operation, the subscriber selects one or more social network selections 205 and 210 with which the subscriber wishes to interact by using up-down, left-right, and select buttons on remote control 118. For example, to select the pre-determined social network selections 205 labeled "MyBook," the subscriber can push a down button on remote control 118 twice, scrolling down through social network selections 205 until "MyBook" is highlighted, and then push a select button on remote control 120 to select the "MyBook" social network service. In a particular embodiment, pre-determined social network selections 205 are included on social network selection screen 200 based upon social network services provided by the operator of IPTV system 100 as a service to subscribers. In another embodiment, upon a particular subscriber's first interaction with social network interface module 148, no pre-determined social network selections 205 are presented on social network selection screen 200, and the subscriber enters information related to social network services with which the subscriber is enrolled by selecting new social network selection 210 and filling in the relevant information in social network site entry box 212, username entry box 214, and password entry box 216. Then, on subsequent interaction with social network interface module 148, pre-determined social network selections 205 include the social network services entered by the subscriber. In a non-limiting example, site entry box 212, username entry box 214, and password entry box 216 can be filled in using remote control 118 to provide alphanumeric entry, using a keyboard (not illustrated), using another information entry mechanism, or a combination thereof. In another embodiment (not illustrated), site entry box 212 is implemented as a pull-down menu pre-populated with the site names for commonly used social network services.

Figure 3:
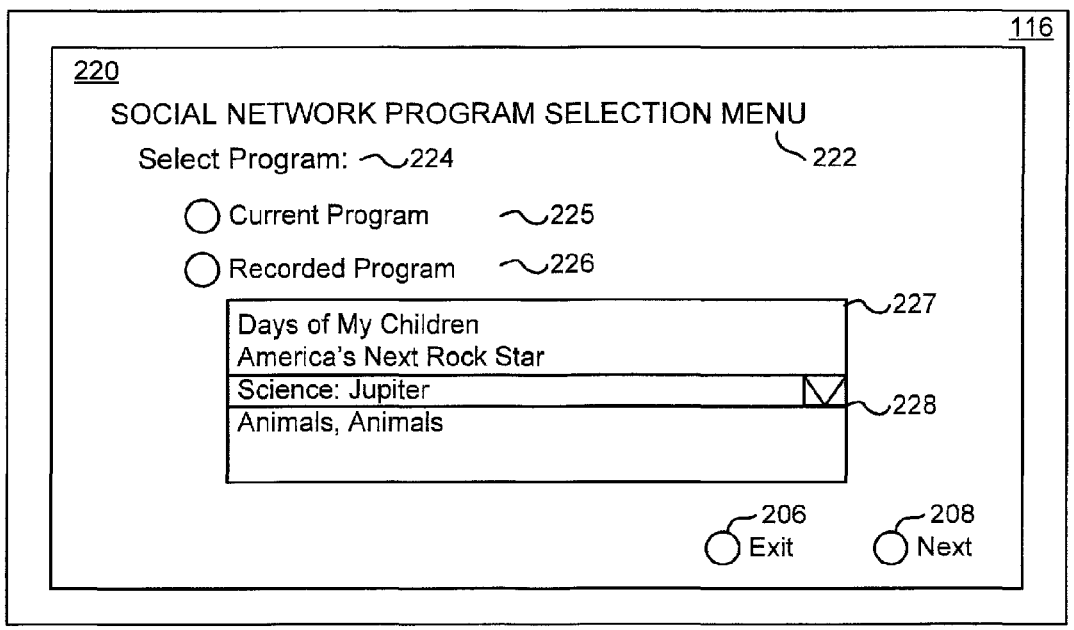

In a particular embodiment, the subscriber can post content on the selected social network services based upon the programming recorded on DVR 120, or the program currently being viewed on set-top box 114. FIG. 3 illustrates an embodiment of a program selection screen 220 depicted on display device 116. Program selection screen 220 includes exit selection 206, next selection 208, a program selection welcome banner 222, a program selection banner 224, a current program selection 225, and a recorded program selection 226. Recorded program selection 226 includes a programs window 227 with a list of programs currently recorded on DVR 120, and a selection window 228. Program selection welcome banner 222 identifies the current screen as the screen with which the subscriber interacts to select a program to comment on or retrieve posted comments from social network services. Program selection banner 224 prompts the subscriber to select from the list of program selections 225 and 226.

In operation, the subscriber selects one or the other of program selections 225 or 226 with which the subscriber wishes to interact by using up-down, left-right, and select buttons on remote control 118. For example, to select the program currently recorded on DVR 120 labeled "Science: Jupiter," the subscriber can push a down button on remote control 118 twice, scrolling down through program selections 225 and 226, until "Recorded Program" is highlighted, and then push the select button on remote control 120 to select recorded program selection 226. The subscriber can then push the down button on remote control 118 three times, scrolling down through the list of programs in programs window 227 until selection window 228 highlights "Science: Jupiter," and then push the select button. Upon completing the selection of the program on which to comment, the subscriber selects next selection 208 to enter a comment about the selected program.

Figure 4:
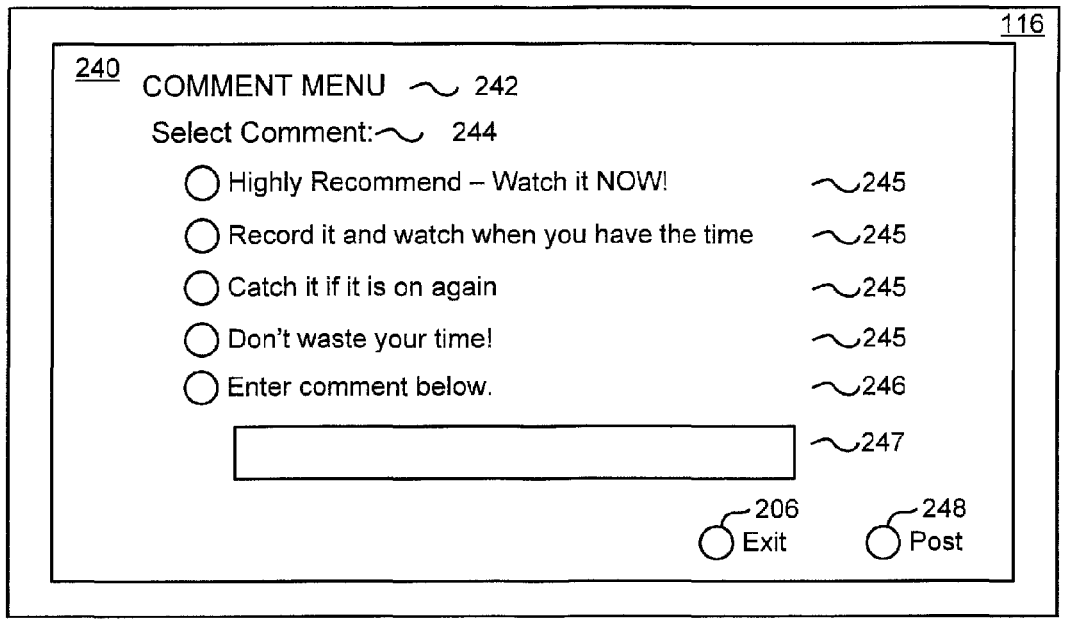

FIG. 4 illustrates an embodiment of a comment selection screen 240 depicted on display device 116. Comment selection screen 240 includes exit selection 206, a comment selection welcome banner 242, a comment selection banner 244, one or more pre-determined comment selections 245, a custom comment selection 246, and a post comment selection 248. Custom comment selection 246 includes a comment entry box 247. Comment selection welcome banner 242 identifies the current screen as the screen with which the subscriber interacts to select a comment to make about the program selected on program selection screen 220. Comment selection banner 244 prompts the subscriber to select from the list of comment selections 245 and 246.

In operation, the subscriber can select one of pre-determined comment selections 245 to indicate the level of interest the subscriber has in the selected program. In the illustrated embodiment, pre-determined comment selections 245 indicate interest in terms of whether or not the subscriber would recommend the subject program. In another embodiment (not illustrated), other pre-determined comment selections can indicate interest in other terms. Thus, in a non-limiting example, pre-determined comment selections can indicate interest in terms of degree of entertainment value, in terms of educational or informational value, in terms of length of the selected program, in other terms, or a combination thereof. The subscriber can also elect to enter a custom comment by selecting custom comment selection 246, and then filling in comment entry box 247 with the desired comment. In a non-limiting example, comment entry box 247 can be filled-in using remote control 118 to provide alphanumeric entry, using a keyboard (not illustrated), using another information entry mechanism, or a combination thereof. Upon completing the selection of the comment, the subscriber selects post selection 248 to post the comment about the selected program on the selected social network service. In a particular embodiment, social network interface module 148 can add other information to the selected comment. In a non-limiting example, social network interface module 148 can add text based information, such as the date and time that the subscriber viewed the selected program, how long the subscriber watched, other similar programs viewed or recorded by the subscriber, other text based information, or a combination thereof. In another non-limiting example, social network interface module 148 can add media based information, such as an image or video clip from the selected program, a video clip from the show, a link to a selected program or to a sign-up page for the IPTV system 100, other media based information, or a combination thereof.

Figure 5:
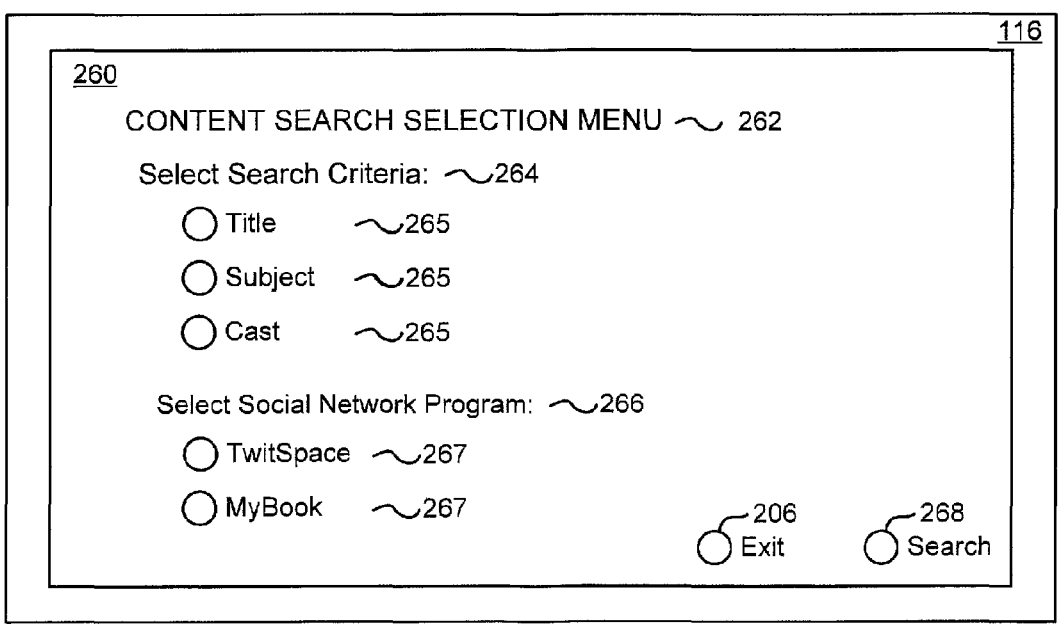

In another embodiment, the subscriber can retrieve posted content from the selected social network services based upon the programming recorded on DVR 120, or the program currently being viewed on set-top box 114. Here, the subscriber selects the program using program selection screen 220 as described above. Upon completing the selection of the program about which to retrieve comments, the subscriber selects next selection 208 to enter search criteria and select a social network service from which to retrieve comments. FIG. 5 illustrates an embodiment of a comment search selection screen 260 depicted on display device 116. Comment search selection screen 260 includes exit selection 206, a content search selection welcome banner 242, a search criteria selection banner 264, one or more pre-determined search criteria selections 265, a social network selection banner 266, one or more social network selections 267, and a search comment selection 268. Content search selection welcome banner 262 identifies the current screen as the screen with which the subscriber interacts to select a search criteria for retrieved comments about the program selected on program selection screen 220. Search criteria selection banner 264 prompts the subscriber to select from the list of pre-determined search criteria selections 245. Social network selection banner 266 prompts the subscriber to select from the list of social network selections 267.

In operation, the subscriber can select one of pre-determined search criteria selections 265 to indicate a particular search term or criteria associated with the selected program on which to search the social network services to find relevant comments. In the illustrated embodiment, pre-determined search criteria selections 265 include "Title," "Subject," and "Cast." For example, the subscriber can search for comments posted on the social network services that relate to the program generally by selecting the pre-determined search criteria selections 265 labeled "Title." The subscriber can further limit the search to one or more of the available social network services by selecting one or more of social network selections 267. Upon completing the selection of the search criteria and the social network service, the subscriber selects search selection 268 to retrieve comments about the selected program on the selected social network services. In response, a social network comment screen (not illustrated) provides the comments from the selected social network services that meet the selected search criteria.

In another embodiment (not illustrated), other pre-determined search criteria selections can provide search options in other terms. Thus, in a non-limiting example, pre-determined search criteria selections can provide for searches in terms of the date the program was produced, the producer or director of the program, the crew associated with the production of the program, other search criteria, or a combination thereof. In another embodiment (not illustrated), one or more of the pre-determined search criteria selections include a search criteria entry box that provides a menu of options or a text based entry for the associated search criteria. For example, a cast search criteria may include a pull-down menu that has a list of the cast members of the selected program, or may provide for the subscriber to enter a name of a cast member. In yet another embodiment (not illustrated), a search criteria selection is included whereby the subscriber can enter a custom search criteria.

Figure 6:
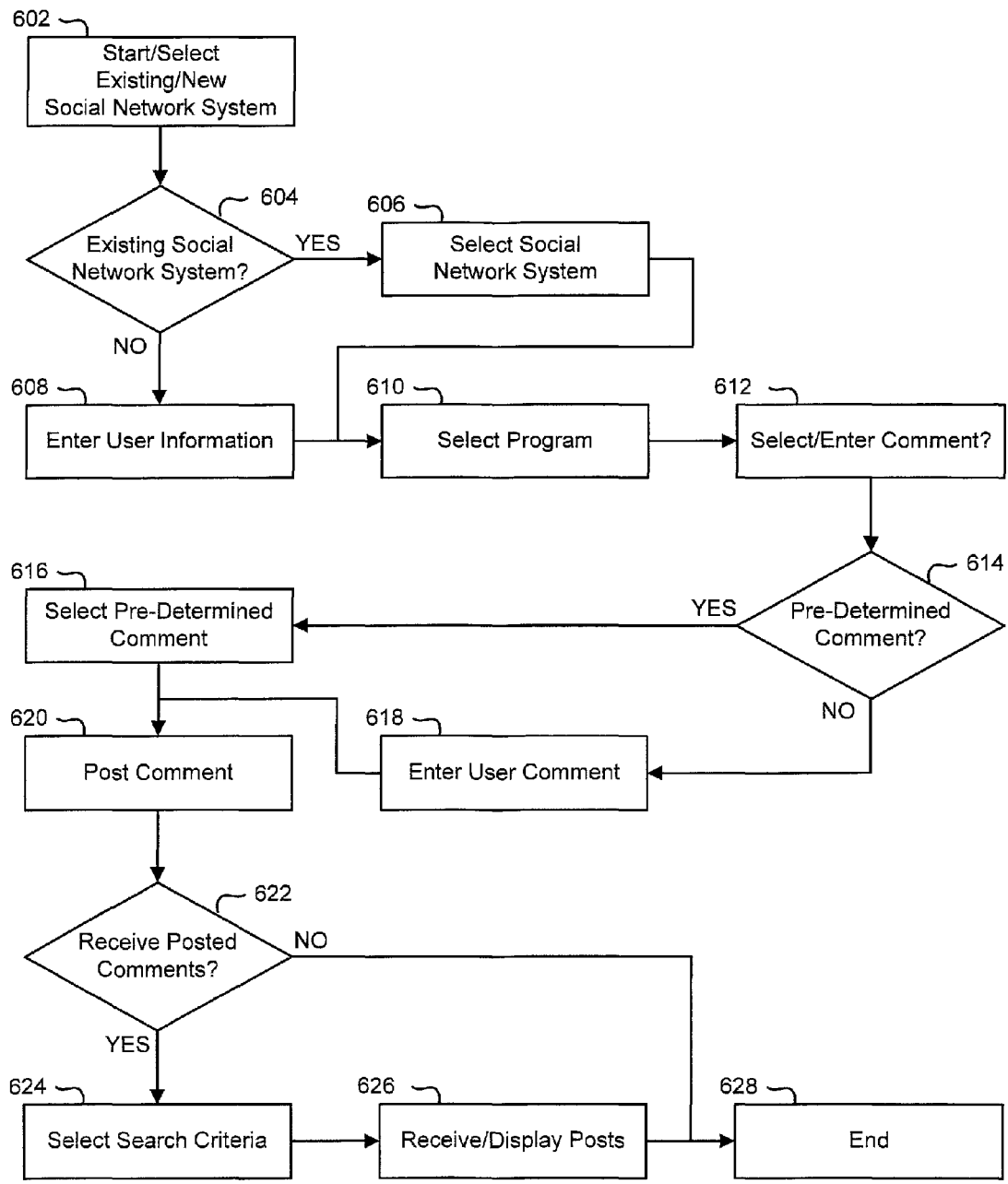
FIG. 6 is a flowchart illustrating an embodiment of a method of interacting with a social networking system in the IPTV network of FIG. 1.

FIG. 6 is a flowchart illustrating an embodiment of a method of interacting with social networking in an IPTV system. The method starts in block 602 where an input is received to select either an existing social network system, or a new social network system. For example, a subscriber can use a remote control to manipulate the image on a display screen to select a pre-determined social network system or to enter a new social network system. A decision is made as to whether an existing social network system was selected in decision block 604. If so, the "YES" branch of decision block 604 is taken and an existing social network system is selected in block 606. If not, the "NO" branch of decision block 604 is taken and user information is entered in block 608. For example, the subscriber can select one or more of the pre-determined social network systems, or can enter the subscribers account information to gain access to a new social network system. After either an existing social network system is selected in block 606, or user information is entered in block 608, an input is received to select to program on which to comment in block 610. For example, the subscriber can select a recorded program, or the program currently being viewed.

An input is received to select either a pre-determined comment, or to enter a new comment in block 612. For example, the subscriber can select from a list of pre-determined comments related to whether or not the subscriber recommends the selected program based upon a pre-determined list of comments, or the subscriber can select to enter their own comment. A decision is made as to whether the pre-determined comment selection was selected in decision block 614. If so, the "YES" branch of decision block 614 is taken and a pre-determined comment is selected in block 616. If not, the "NO" branch of decision block 614 is taken and a user comment is entered in block 618. After either a pre-determined comment is selected in block 616, or a user comment is entered in block 618, the comment is posted to the selected social network system in block 620.

A decision is made as to whether or not to receive posted comments about the selected program in block 622. Is not, the "NO" branch of decision block 622 is taken, and processing ends at block 628. If so, the "YES" branch of decision block 622 is taken and an input is received to select a search criteria in block 624. For example, a subscriber can choose to receive posts from the selected social network system that relate to the cast of the selected program. The posts that match the search criteria are received and displayed in block 626, and processing ends in block 628.

Figure 7:
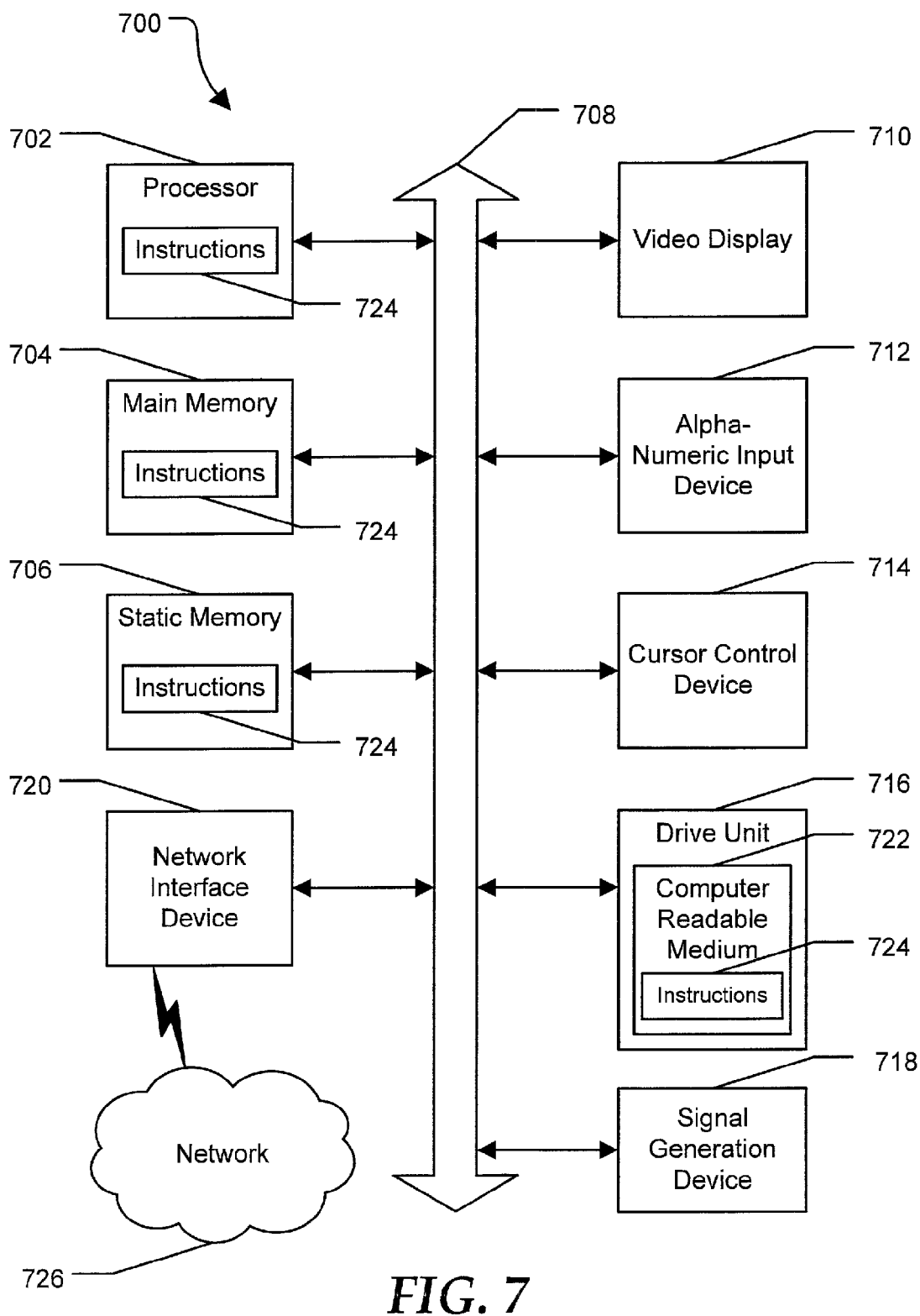
FIG. 7 is a block diagram showing an illustrative embodiment of a general computer system.

FIG. 7 shows an illustrative embodiment of a general computer system 700 in accordance with at least one embodiment of the present disclosure. Computer system 700 includes a set of instructions that can be executed to cause computer system 700 to perform any one or more of the methods or computer based functions disclosed herein. Computer system 700 can operate as a standalone device or can be connected via a network to other computer systems or peripheral devices.

In a networked deployment, computer system 700 operates in the capacity of a server or as a client computer in a server-client network environment, or as a peer computer system in a peer-to-peer (or distributed) network environment. Computer system 700 can also be implemented as or incorporated into various devices, such as a personal computer (PC), a tablet PC, a set-top box, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, computer system 700 is implemented using electronic devices that provide voice, video or data communication. Further, while computer system 700 is illustrated as a single system, the term "system" shall also be taken to include any collection of systems or sub-systems that individually or jointly execute a set, or multiple sets, of instructions to perform one or more computer functions.

Computer system 700 includes a processor 702 such as a central processing unit (CPU), a graphics processing unit (GPU), or both. Moreover, computer system 700 includes a main memory 704 and a static memory 706 that communicate with each other via a bus 708. Computer system 700 further includes a video display unit 710, such as a liquid crystal display (LCD), an organic light emitting diode (OLED), a flat panel display, a solid state display, or a cathode ray tube (CRT). Additionally, computer system 700 includes an input device 712, such as a keyboard, and a cursor control device 714, such as a mouse. Computer system 700 also includes a disk drive unit 716, a signal generation device 718, such as a speaker or remote control, and a network interface device 720.

In a particular embodiment, disk drive unit 716 includes a computer-readable medium 722 in which one or more sets of instructions 724 are embedded. Instructions 724 embody one or more of the methods or logic as described herein. In a particular embodiment, instructions 724 reside completely, or at least partially, within main memory 704, static memory 706, and/or within processor 702 during execution by computer system 700. Main memory 704 and processor 702 also include computer-readable media. Network interface device 720 provides connectivity to a network 726 such as a wide area network (WAN), a local area network (LAN), or other network. The present disclosure contemplates a computer-readable medium that includes instructions 724 or receives and executes instructions 724 responsive to a propagated signal, so that a device connected to network 726 can communicate voice, video or data over network 726. Further, instructions 724 can be transmitted or received by network 726 via network interface device 720.

In an alternative embodiment, dedicated hardware implementations such as application specific integrated circuits, programmable logic arrays and other hardware devices can be constructed to implement one or more of the methods described herein. Applications that include the apparatus and systems of various embodiments can broadly include a variety of electronic and computer systems. One or more embodiments described herein can implement functions using two or more specific interconnected hardware modules or devices with related control and data signals that can be communicated between and through the modules, or as portions of an application-specific integrated circuit. Accordingly, the present system encompasses software, firmware, or hardware implementations, or a combination thereof.

In accordance with various embodiments of the present disclosure, the methods described herein can be implemented by software code executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives can be considered a distribution medium that is equivalent to a tangible storage medium. Accordingly, the disclosure is considered to include any one or more of a computer-readable medium or a distribution medium and other equivalents and successor media, in which data or instructions can be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments can be apparent to those of skill in the art upon reviewing the disclosure. Other embodiments can be utilized and derived from the disclosure, such that structural and logical substitutions and changes can be made without departing from the scope of the disclosure. Additionally, the illustrations are merely representational and may not be drawn to scale. Certain proportions within the illustrations may be exaggerated, while other proportions may be minimized Accordingly, the disclosure and the figures are to be regarded as illustrative rather than restrictive.

The Abstract of the Disclosure is provided to comply with 37 C.F.R. § 1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A set-top box, comprising:
   a memory to store computer instructions;
   a social network interface controller; and
   a remote control interface controller coupled with the memory and the social network interface controller,
   wherein the social network interface controller responsive to executing the computer instructions performs operations comprising:
      receiving a first selection of a predetermined comment of a plurality of predetermined comments from the remote control interface controller, wherein the plurality of predetermined comments relate to a content item being presented by the set-top box and are displayed by equipment of a user;
      receiving a second selection of a characteristic of the content item of a plurality of predetermined characteristics of the content item, wherein the plurality of predetermined characteristics of the content item are displayed by the equipment of the user; and
      presenting limited posts on a display device that is presenting the content item, wherein the limited posts are a subset of a group of posts related to the content item, and wherein the limited posts are selected based on the second selection of the characteristic of the content item.

2. The set-top box of claim 1, wherein the set-top box displays a plurality of content items on the display device, a selected content of the plurality of content items resulting in the content item being presented by the set-top box, wherein the limited posts are selected by the social network interface controller from a group of posts based on posting criteria established from user input at the set-top box including the second selection of the characteristic of the content item.

3. The set-top box of claim 2, wherein the plurality of content items includes a first particular content item that is recorded on the set-top box.

4. The set-top box of claim 3, wherein the plurality of content items includes a second particular content item that is being displayed by the equipment of the user concurrently with receiving the first selection of the predetermined comment.

5. The set-top box of claim 1, wherein the social network interface controller further receives a third selection of a social network system upon which the first selection of the predetermined comment is posted, wherein interaction with the social network system is initiated based on a selection of a channel corresponding to the social network system, wherein the interaction continues via windows presented on the display device after selection of a different channel, and wherein the interaction is ceased based on a selection of ending the interaction established from user input at the set-top box.

6. The set-top box of claim 5, wherein the third selection includes enrollment information associated with the user of the set-top box.

7. A method comprising:
   receiving, by a social network interface module, a selection of a content item, wherein the content item is received by a set-top box of an Internet protocol television system;

receiving, by the social network interface module, a selection of a predetermined comment of a plurality of predetermined comments from the set-top box, wherein the plurality of predetermined comments are displayed by equipment of a user, and wherein the predetermined comment is about the content item, and is selected based on user input at the set-top box;

receiving, by the social network interface module, a selection of a characteristic of the content item from a plurality of characteristics of the content item, wherein the plurality of characteristics of the content item are displayed by the equipment of the user; and presenting, by the social network interface module, limited posts regarding the content item on a display device, wherein the limited posts are originated by other computing devices in communication with a social network system, wherein the limited posts are a subset of a group of posts on the social network system, and wherein the limited posts are related to the selection of the characteristic of the content item.

8. The method of claim 7, further comprising, before posting the predetermined comment, receiving by the social network interface module a selection of the social network system from among a plurality of social network systems, wherein the selection is received by the equipment of the user.

9. The method of claim 8, wherein the receiving of the selection of the social network system further comprises receiving enrollment information associated with the user.

10. The method of claim 7, wherein interaction with the social network system is initiated based on a selection of a channel corresponding to the social network system, wherein the content item is selected from among a plurality of content items, wherein the interaction continues after selection of a different channel via windows presented at a display device.

11. The method of claim 10, wherein the plurality of content items includes a first particular content item that is recorded on the set-top box.

12. The method of claim 11, wherein the plurality of content items includes a second particular content item that is being displayed by the equipment of the user concurrently with the selection of the predetermined comment.

13. The method of claim 12, further comprising:
receiving, by the social network interface module, a selection of a search criteria associated with the second particular content item;
receiving, by the social network interface module, a post from the social network system based upon the search criteria; and
sending, by the social network interface module, the post to the set-top box.

14. Machine-executable code embedded within a non-transitory tangible medium and including executable instructions that, when executed by a processor, cause the processor to perform operations comprising:
receiving at a social network interface module a selection of a predetermined comment of a plurality of predetermined comments from a set-top box, wherein the plurality of predetermined comments are displayed by equipment of a user, and wherein the predetermined comment is about a content item received by a set-top box in an Internet protocol television system, and is selected by a user of the set-top box;
receiving a selection of a characteristic of the content item of a plurality of predetermined characteristics of the content item, wherein the plurality of predetermined characteristics of the content item are displayed by the equipment of the user; and
presenting a limited number of posts regarding the content item on a display device, wherein the limited number of posts are originated by other computing devices in communication with a social network system, and wherein the limited number of posts are a subset of a group of posts related to the content item that are provided to the social network system, wherein the subset is selected based on the selection of the characteristic of the content item.

15. The machine-executable code embedded within the non-transitory tangible medium of claim 14, wherein the operations further comprise, before posting the predetermined comment, receiving at the social network interface module a selection of the social network system from among a plurality of social network systems, wherein the selection is received by the equipment of the user, wherein the characteristic comprises a cast of the content item.

16. The machine-executable code embedded within the non-transitory tangible medium of claim 15, wherein, the operations further comprise:
receiving at the social network interface module a selection of the social network system; and
receiving enrollment information associated with the user.

17. The machine-executable code embedded within the non-transitory tangible medium of claim 16, wherein the content item is selected from among a plurality of content items, wherein interaction with the social network system is initiated based on a selection of a channel corresponding to the social network system, wherein the interaction continues after selection of a different channel, and wherein the interaction is ceased based on a selection of ending the interaction established from user input at the set-top box.

18. The machine-executable code embedded within the non-transitory tangible medium of claim 17, wherein the plurality of content items includes a first particular content-ment item that is recorded on the set-top box.

19. The machine-executable code embedded within the non-transitory tangible medium of claim 18, wherein the plurality of content items includes a second particular content item that is being displayed by the equipment of the user concurrently with the selection of the predetermined comment.

20. The machine-executable code embedded within the non-transitory tangible medium of claim 19, wherein the operations further comprise:
receiving at the social network interface module a selection of a search criteria associated with the second particular content item;
receiving at the social network interface module a post from the social network system based upon the search criteria; and
sending the post to the set-top box.

* * * * *